United States Patent [19]

Fishman et al.

[11] Patent Number: 4,541,008
[45] Date of Patent: Sep. 10, 1985

[54] TELEVISION SIGNAL BANDWIDTH REDUCTION USING VARIABLE RATE TRANSMISSION

[75] Inventors: Max Fishman, Sacramento; James D. Nichols, Carmichael, both of Calif.

[73] Assignee: Jones Futura Foundation, Ltd., Fair Oaks, Calif.

[21] Appl. No.: 453,538

[22] Filed: Dec. 27, 1982

[51] Int. Cl.³ .............................................. H04N 9/32
[52] U.S. Cl. ..................................... 358/13; 358/105; 358/138; 358/143
[58] Field of Search ................. 358/133, 105, 31, 142, 358/143, 137, 136, 138, 261, 13

[56] References Cited

U.S. PATENT DOCUMENTS

| | | | |
|---|---|---|---|
| 4,232,338 | 11/1980 | Netravali et al. | 358/105 |
| 4,240,113 | 12/1980 | Michael et al. | 358/105 |
| 4,362,775 | 11/1981 | Widergren et al. | 358/13 |

Primary Examiner—John C. Martin
Assistant Examiner—Edward L. Coles
Attorney, Agent, or Firm—Mark C. Jacobs

[57] ABSTRACT

A television signal transmission system incorporating circuits for processing and encoding a repetition reduced signal. The system contains a component separator for generating sampled digital values of the color and intensity components of a television signal, storage buffer for storing the separated components of the video signal, a data processor for comparing successive samples of the component video data and for generating variable-length blocks of data to represent either slowly varying signals or rapidly varying signals, circuitry for encoding and multiplexing audio and synchronization data into the signal stream, circuitry for encoding signal and control data for transmission to a receiver, circuit for processing the received signal to establish synchronization, circuit for demultiplexing the received signal to extract the audio information, and means for demultiplexing the component video information and reconstructing the composite video signal from the repetition-reduced representation.

4 Claims, 6 Drawing Figures

FIGURE 1 FRAME SYNCHRONIZER

FIGURE 2 DIGITAL Y,I,Q SEPARATOR DERIVED FROM BASIC FRAME SYNCHRONIZER

FIGURE 3 HYBRID BANDWITH COMPRESSION SYSTEM, ENCODER PORTION

FIGURE 4 BLOCK DIAGRAM OF HYBRID BANDWIDTH COMPRESSION SYSTEM, REENCODER PORTION

FIGURE 5 ENCODER INPUT AND OUTPUT WAVEFORMS FOR ILLUSTRATING TIME RELATIONS

FIGURE 6 SYNCHRONIZING SIGNALS

TELEVISION SIGNAL BANDWIDTH REDUCTION USING VARIABLE RATE TRANSMISSION

BACKGROUND OF THE INVENTION

The present invention relates generally to television signal transmission systems, and more specifically, to a television signal transmission system employing both analog and digital signal processing techniques for reduced bandwidth requirements.

Broadcast television has assumed a dominant role in our everyday life as a result of an overwhelming investment in home television receivers. When one thinks of television signals, it is therefore natural to think in terms of the television signal broadcast into the home. More efficient encoding of this signal would free valuable spectrum space. However, the television receiver would probably have to be modified or replaced at prohibitive cost in any scheme in which the television signal were appreciably altered. Accordingly, the present invention is concerned with applications involving point-to-point transmission of picture material, long-lines cable distribution, and satellite transmissions rather than specific applications involving broadcast to the home.

Most early efforts in picture coding used analog techniques in an attempt to reduce the analog bandwidth. Today, complex manipulations used to achieve either transmission security or reduced bandwidth are more easily accomplished by first sampling and digitizing the signal and then handling the signal processing in digital form. The processed signal may then be transmitted directly over a ditial channel or converted back to analog form for transmission over an analog channel. Direct digitization of broadcast television signals requires transmission rates of approximately 100 Mb/s for broadcast quality transmissions, representing an increased bandwidth requirement of about 10 times that used for analog transmission of the analog signal. A survey of tradeoffs involved in applications of digital signal processing of television signals is found in an article by Netravali and Limb entitled "Picture Coding: A Review", Vol. 68 No. 3, pp. 366–406, PROCEEDINGS OF THE IEEE, March 1980.

The required bandwidth in television and other image scanning systems depends upon the rate of change of signal intensity along a line of the scanned image. The scanning rate in conventional systems is uniform, and the bandwidth then depends upon the maximum rate of change needed to achieve an acceptable picture quality. In broadcast television, there is a high degree of correlation of the luminance signal from frame to frame. Nevertheless, camera movement and rapid changes of scene can reduce the interframe correlation appreciably. For teleconferencing and videotelephone type scenes where the camera is stationary and the movement of subjects rather limited, only a small fraction of the video samples change appreciably from scene to scene. Consequently, there would be less frame-to-frame correlation in average scenes transmitted in broadcast TV than in videotelephone or videoconference scenes. Measurements have also indicated that typical variations of signal intensity along a single scan tend to vary in bunches, with little variation over one interval followed by a jump in level to the next interval; during a typical interval which usually exceeds 2% of the line duration, the signal intensity remains substantially unchanged.

Television transmission of a single, fixed scene may be achieved using a slow scan rate. In this case, the transmission bandwidth requirement would be small. However, a slow-scan, narrow bandwidth system would be incapable of transmitting a changing scene without serious degradation of picture quality. The time required to transmit video signal information is inversely proportional to the rate of change of the signal intensity. Thus, various inventors have proposed transmission schemes in which slowly varying information would be transmitted at a rapid scanning rate while rapidly varying information would be transmitted at a slow rate.

The concept of variable velocity scanning for signal transmission in described in U.S. Pat. No. 2,307,728 issued to Mertz. In addition, the applicant is also aware of pertinent in one way or another to the present invention:

(1) No. 2,664,462 issued to Bedford et al
(2) No. 2,965,709 issued to Cherry et al
(3) No. 2,306,435 issued to Graham
(4) No. 3,204,026, No. 3,384,710, and No. 3,459,886 all issued to G. J. Doundoulakis, as either sole or joint inventor.

In the early days of television, variable velocity scanning, i.e., VVS, was a theoretically feasible concept but not one that could be implemented economically in a practical form. Semiconductor devices were still in their infancy. Large scale integration of multiple functions performed by a compact combination of semiconductor devices was almost beyond imagination.

Several early attempts to implement TV systems incorporating VVS produced disappointing results. These schemes were designed on the premise that the rate of change of the signal from a TV camera could be used to control its scanning velocity, thereby reducing the total bandwidth requirements. The bandwidth requirements to transmit the rate of change information, however, were greater than those of the TV camera output signal. Consequently, a greater bandwidth was actually required than would have been required to transmit the TV signal itself using a uniform scanning velocity.

Successful implementation of the VVS concept depends on the use of storage of the TV camera signal. The delayed signal is used together with the rate of change of the camera signal to produce a variable velocity scan. One of the early analog techniques for implementing the VVS concept is described by Doundalakis in his 1965 patent based on a 2 dimensional line to line comparison of stored data and the use of storage tubes. This technique utilizes an unconventional bidirectional scanning method and dispenses with the retrace used in home television receivers. The technique is extended somewhat in his 1969 patent which describes a system using a comparison of corresponding pixels in three frames. Little has been done, however, to extend his achievement since his methods are primarily applicable to black and white transmissions and encounter significant synchronization problems for even this application.

Since around 1970, new forms of coding systems for transmission of picture information have appeared at a rapid rate. These include systems using predictive coding, transform coding, interpolative and extrapolative coding, statistical coding and other methods not neatly classified. Each of these classifications can be broken down further according to whether the coding method is fixed or adaptive. In spite of the large proliferation of coding methods since the 1960's, it is still attractive to consider new system designs based on variations of the VVS concept.

Without high-speed storage, attempts at bandwidth reduction in television systems employing uniform scan have produced poor results. Application of high-speed semiconductor memories, however, makes it possible to employ a uniform scan and to code the signal intensity information into forms in which transmission of non-changing, redundant information is inhibited. The result is a variable rate transmission (VRT) of information which may take on several forms to achieve the same sort of objectives as those of the VVS. For example, one can digitize the intensity information and compare the magnitude of adjacent samples. For essentially constant intensity, it will suffice to transmit a representation of the magnitude at the beginning of a string of equivalued intensities, timing information marking the start of the string, and the length of the string over which the intensity remains essentially constant. Such a coding scheme is called "run-length'encoding".

The present invention uses an alternate form of run length encoding in which slowly varying information is represented by a reduced number of samples. Rapidly varying information, however, is identified by a rate-tag; and the data at almost every sampling point in the rapidly varying block is transmitted over a fixed block length. By adding rate-tag data to label only the rapidly varying information, slowly varying information can be transmitted rapidly while rapidly varying information is transmitted slowly. The concept of VRT can be enhanced further by using interpolation to reconstruct the data represented by a sequence of discrete levels over successive blocks.

SUMMARY OF THE INVENTION

It is an object of the present invention to provide a television signal transmission system which reduces the required transmission bandwidth with no appreciable deterioration in quality.

Another object of this invention is to provide a means for encoding a repetition reduced represenation of a partially repetitive signal and for converting the repetition reduced signal into a high quality reconstruction of the original signal.

An additional object of the invention is to provide a means for identifying blocks of information over which the signal is varying rapidly and to transmit a data representation of the signal magnitude at almost every sampling point over each such block; each block of data over which the signal is almost constant would be represented by a reduced number of samples.

A further object of the invention is to embed the rate-tag data, which identify the blocks containing rapidly varying information, into the information stream containing the input sampled data in such a way as to minimize the introduction of excess control data.

A still further object of the invention is to provide a system in which conventional television receivers will be unable to process the encoded signals to obtain useful picture or sound information.

It is yet another object of this invention to control the access to the system by addressable control signals designating authorized users and designating higher order encryption processes.

BRIEF DESCRIPTION OF THE DRAWINGS

Other objects and advantages of the present invention will be apparent from the following detailed description of certain preferred embodiments thereof, and from the attached drawings in which like reference numerals represent like parts and wherein.

DETAILED DESCRIPTION OF PREFERRED EMBODIMENTS

Figure 1:
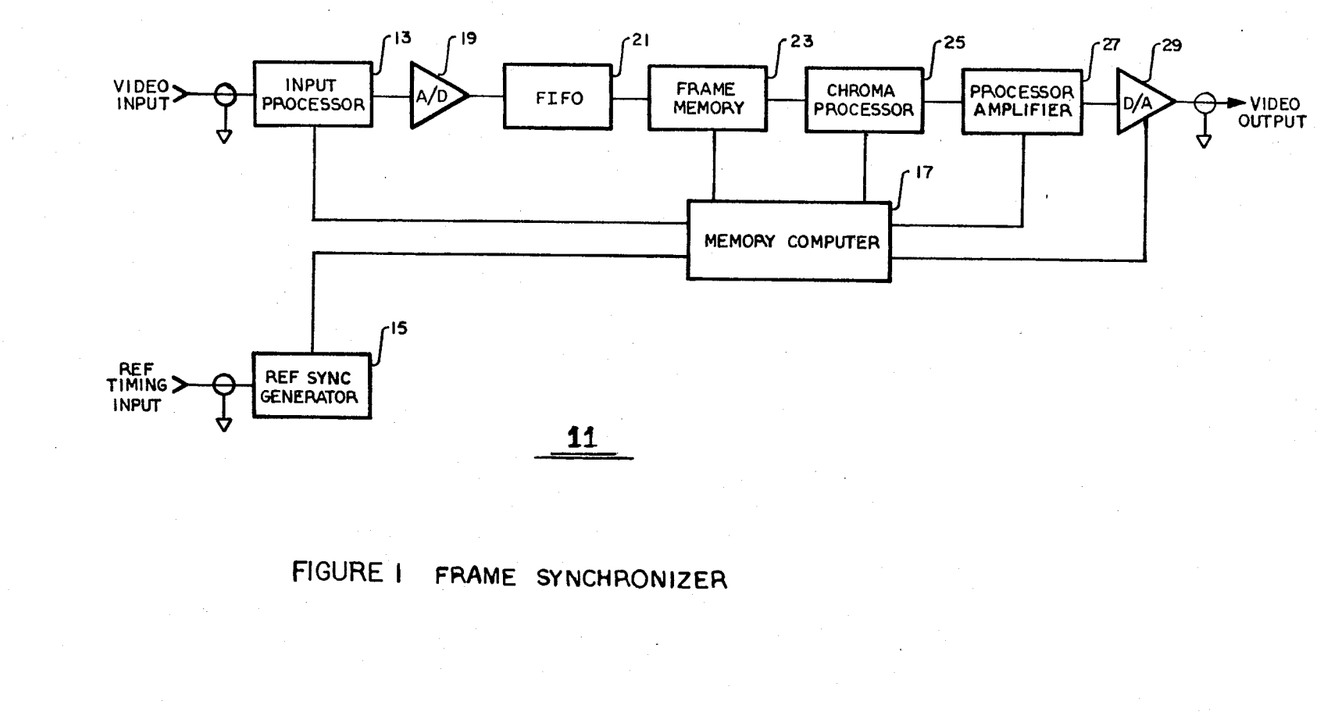
FIG. 1 is a simplified block diagram of a typical frame synchronizer used by broadcasters to eliminate picture roll.
Figure 2:
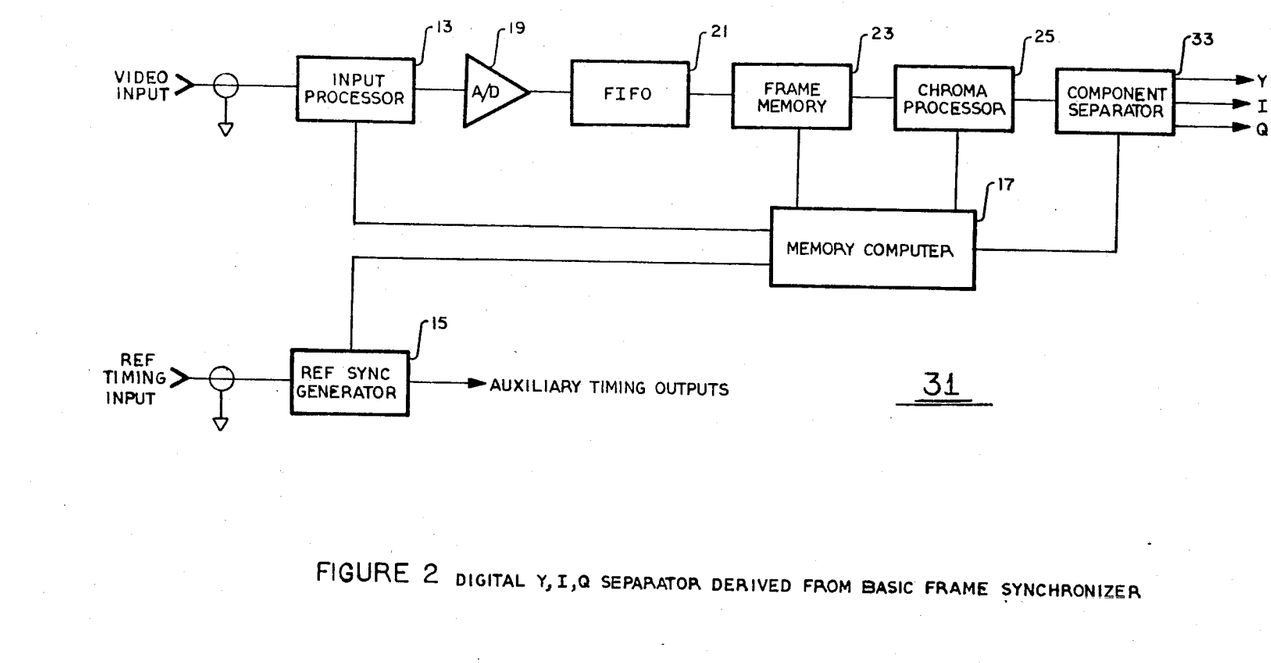
FIG. 2 is a simplified block diagram of a digital Y, I, Q separator derived from the basic frame synchronizer shown in FIG. 1.

The present invention, in one embodiment as will hereinafter be described, depends on decomposing an NTSC television signal into its Y, I, and Q components, the Y, I, and Q components may be obtained conveniently by using the same digital techniques as employed in frame synchronizers to eliminate picture roll. A typical block diagram of a commercially available frame synchronizer 11 is shown in FIG. 1. As can be seen, the frame synchronizer 11 includes an input processor 13, a reference sync generator 15, a memory computer 17, an A/D converter 19, a first in-first out buffer 21, a frame memory 23, a chroma processor 25, a processing amplifier 27 and a D/A converter 29. An implementation of a digital Y, I, Q separator 31 according to this invention is achieved by modifications of the FIG. 1 frame synchronizer 11 as shown in FIG. 2. A brief description of the operation of the digital Y, I, Q component separator 31 will now be presented with the aid of FIG. 2.

An NTSC video signal is applied to input processor 13. Input processor 13 strips the sync signal component from the video input and establishes a burst gate for a phase-locked-loop (PLL) which contained therein (not shown). A clock signal of four times the subcarrier clock-rate is generated by the PLL and applied to an analog-to-digital converter (ADC) 19. Synchronization of the transmitted signals to a local timing reference depends on the use of a precision reference timing signal which is applied to the input of a reference sync generator 15. Steering circuits in a memory computer 17 steer the digital data from the ADC 19 into a first-in first-out (FIFO) buffer 21 which 'rearranges' the time-varying input into a timing format synchronous with the reference sync generator 15 prior to writing the data into a frame memory 23. The FIFO buffer 21 prevents read-/write contention in the frame memory 23.

The function of the chroma processor 25 is to maintain proper chroma phase even when the phases of the reference color burst signals from the input video signal and the reference timing input are not in phase. The component separator 33 may either be an integral part of any one of a number of commercially available frame synchronizers or may be readily achieved with minor modifications of existing equipment.

A discussion of the mathematics describing the operation of the digital Y,I,Q separator 31 is presented in an article by Lowry and Kwa entitled "Coder/Encoder Units for RGB and NTSC Signals" in the SMPTE JOURNAL, Volume 90, Number 10, of October 1981.

Figure 3:
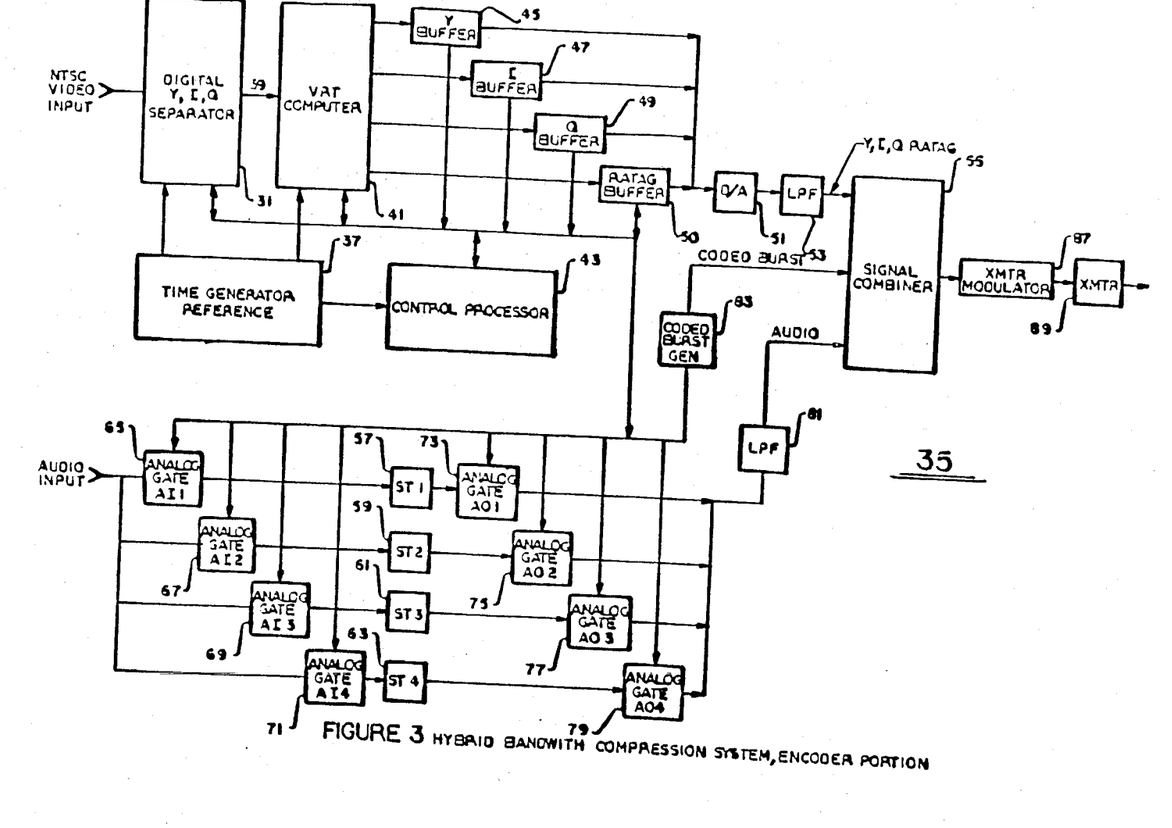
FIG. 3 is a block diagram of the encoder portion of a hybrid bandwidth compression system constructed according to the teachings of the present invention.
Figure 4:
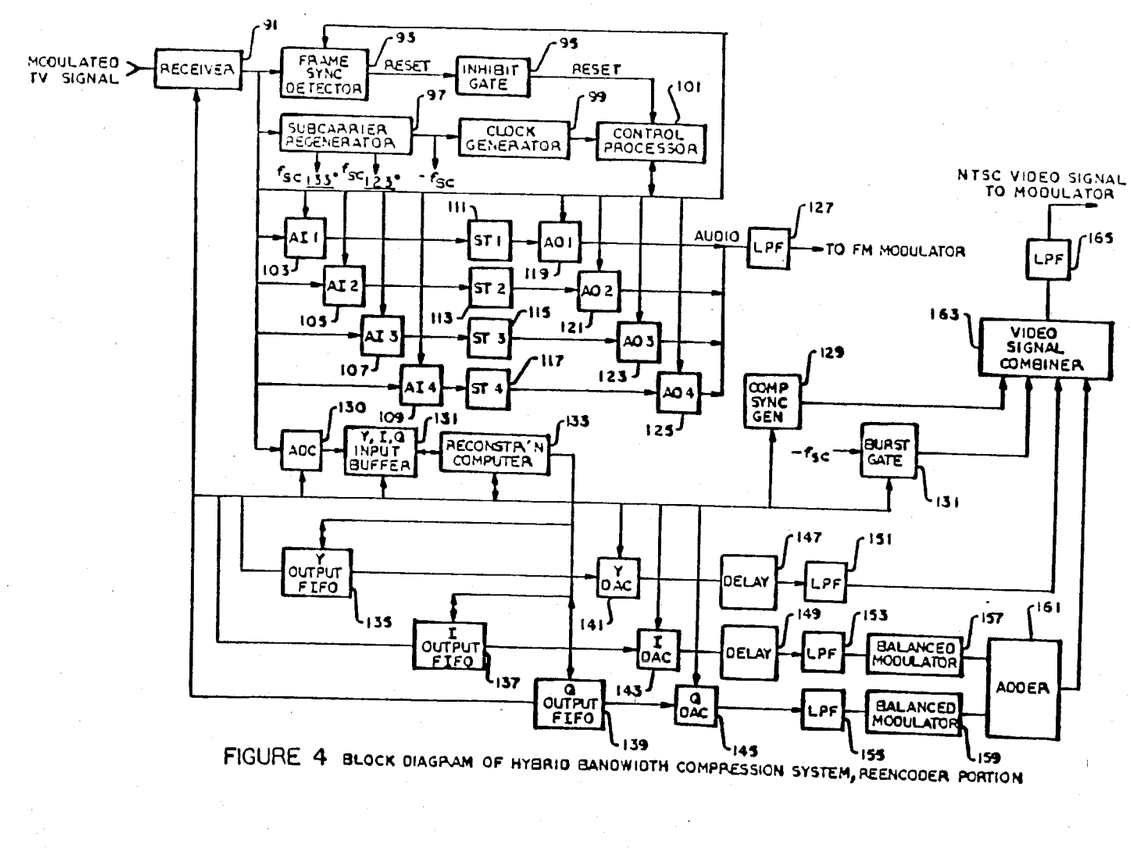
FIG. 4 is a block diagram of the decoder and signal reconstruction portion of the system of the present invention.

The functioning of one embodiment of a bandwidth compression system of this invention is shown in FIGS. 3 and 4. For clarity, the embodiment shown in FIGS. 3 and 4 is represented as a hybrid system in which most of the functions are obtained using digital techniques; but certain key functions are obtained using analog techniques. Actually, almost all of the operations performed could use digital techniques to achieve corresponding functions.

The operation of the encoder portion of a hybrid (part-digital, part analog) system 35 for bandwidth reduction of an NTSC television transmission is shown in FIG. 3. An NTSC composite video signal is applied at the input of a digital Y, I,Q component separator 31. Time-base variations in the input signal with respect to the outputs of a reference timing generator 37, are eliminated with the aid of the digital Y, I, Q separator 31 by internal buffering. The output 39 of separator 31 shown as a single line to a VRT computer 41 actually represents three streams of digital data; that is, the digital data to computer 41 consists of sampled Y, I, and Q information. The NTSC analog signal is sampled at four times the color subcarrier rate. The digital output signals delivered to the VRT computer 41 consist of samples of the luminance signal Y sampled at four times the color reference subcarrier frequency, of the inphase component of the chrominance signal I sampled at the subcarrier rate, and the quadrature component of the chrominance signal Q sampled at the subcarrier rate. If desired, the I and Q information could be sampled at two times the subcarrier rate for a slight increase in resolution along with an increase hardware complexity.

A control processor 43 accepts synchronization information from the reference timing generator 37 and from the digital Y, I, Q separator 31 and status information from various other modules in the system and exercises full or partial control of almost every major module in the system. The digital Y,I,Q separator 31 accepts the input composite NTSC encoded video signal, digitizes the composite video under control of the control processor 43, stores Y, I, and Q data in its associated image memory (not shown) and applies the output digital data, status data and certain control information to the variable rate transmission (VRT) computer 41.

Bandwidth reduction is achieved by using a modified form of runlength encoding. Sampled input data is stored in image memory (not shown) associated with control processor 43. For illustrative purposes only, it is assumed that the "fixed" input-data block contains 16 samples. It is to be noted however that a restriction to an input block size of 16, however, is not mandatory. Every fourth sample of Y, I and Q is transferred with minimum delay to memory blocks associated with the variable rate transmission (VRT) computer 41. Parallel processing is used to determine differences between adjacent samples of the data transferred to the memory blocks operated upon by the VRT computer 41; that is, the VRT computer 41 determines the difference between data samples separated by three sampling intervals, where the Y sampling interval contains four times as many clock cycles as the I and Q sampling intervals.

When the difference between adjacent samples processed by VRT computer 41 is less than 4 units, where full scale is 255 units, the data is considered to be slowly varying data. Slowly varying data is normally represented by transmitting every eighth input sample. No special rate-tag data is added. When a large difference between adjacent samples is detected, a rate-tag replaces the last pair of transmitted samples contained in the prior block. The rate-tag consists of a pair of transmitted samples of 0 units when the run length of the output representation of slowly varying data is equal to 2; otherwise, the rate tag consists of a pair of transmitted samples each of whose magnitudes is 255 units. A block of 16 samples is transmitted immediately, following the rate-tag.

Figure 5:
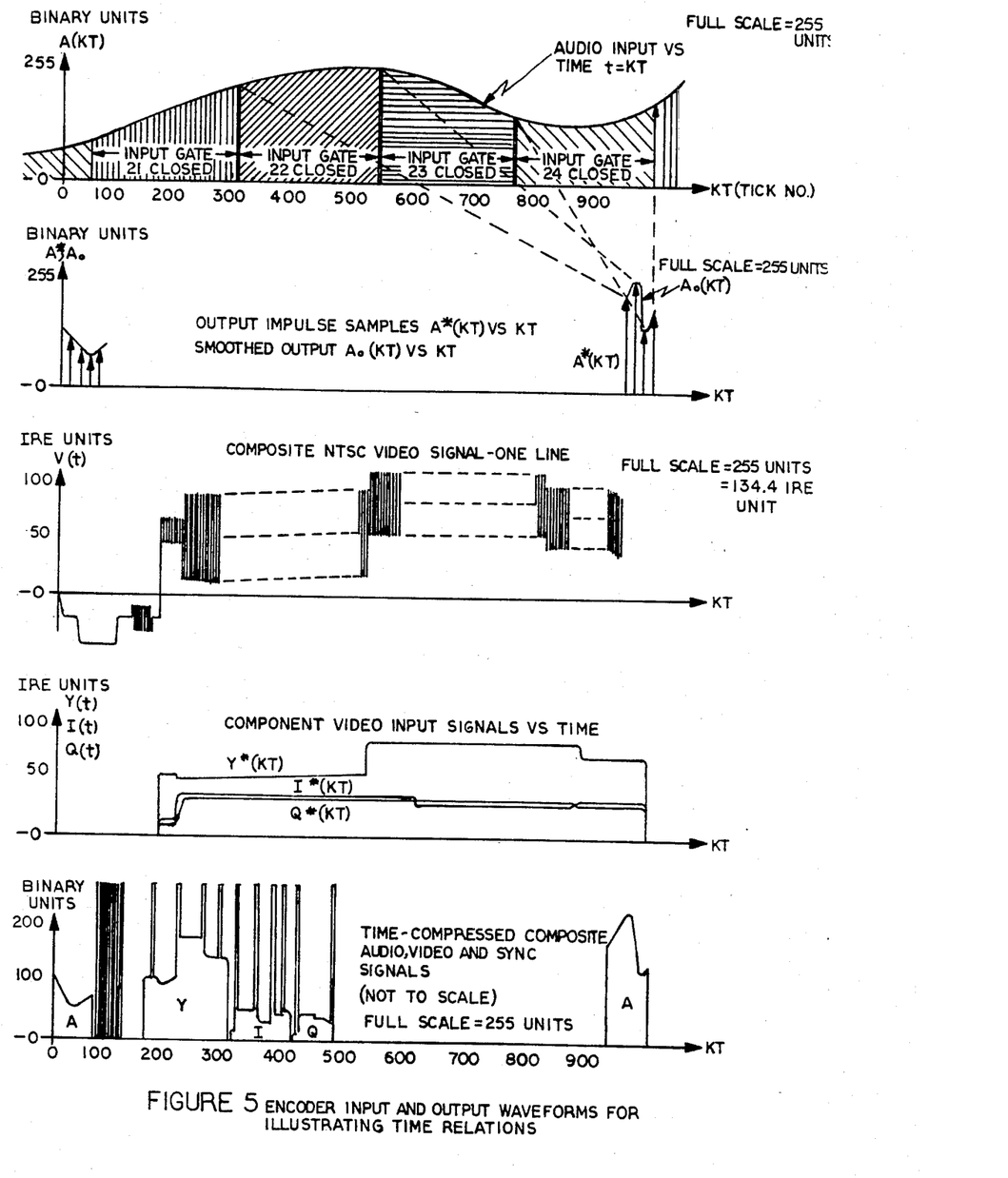
FIG. 5 illustrates the time-compressed video output signal which results from the action of the encoder on a segment of a component separated analog video signal.

In the case of a rapidly varying segment, the first 14 samples represent the actual input sampled data on a one-to-one basis. If the following segment contains only slowly varying data, the last 2 samples of a block of 16 samples following a rate-tag also represent the input data on a one-to-one basis; otherwise, the last two transmitted samples represent a rate-tag which occurs as a pair of impulses of 255 units. In the reconstruction process, rate-tag data is replaced by interpolated data. VRT computer 41 loads its compressed Y, I and Q data derived by the process described above into output buffers 45, 47 and 49 respectively. The action of this algorithm on video data is illustrated in FIG. 5. Rate tag buffer 50 receives and buffers the data.

The time-compressed Y, I and Q data stored in output buffers 45, 47 and 49 are read out sequentially into the digital to analog converter (DAC) 51 under direction of control processor 43. The time-division multiplexed analog signal representing the Y, I Q and imbedded rate-tag data are then passed through a low pass filter (LPF) 53 to analog signal combiner 55. Y,I, Q and rate-tag data are thus represented as a segment of a pulse amplitude modulated analog signal which also includes audio and synchronization information in a time-division multiplex format.

Audio information is sampled during each line under direction of control processor 43. The audio information is sampled sequentially, over as long an interval as possible, 4 times during each line. Sampling of the audio data is accomplished by charging storage devices 57, 59, 61 and 63 through the input analog gates 65, 67, 69 and 71 respectfully. Since the storage time is short, it is convenient to use small storage capacitors as the storage elements. The analog information stored in the preceding line is transmitted at the beginning of the next line in a rapid sequential burst through the output analog gates 73, 75, 77 and 79 to low pass filter 81. The audio signal then proceeds to signal combiner 55. The audio information is sampled rather slowly and read out rapidly. Details of the timing involved will be discussed later.

Following the encoding of the audio information into 4 PAM output samples, the audio output analog gates are disconnected from signal combiner 55 and the coded burst generator 83 is connected to signal combiner 55. Synchronization data consists of a coded burst frame index signal transmitted once per frame and a succession of reference burst signals transmitted every line (see FIG. 6). Since the separated component video signals contain little information content at the color reference subcarrier frequency (3.579545 M Hz.), it is natural to represent the frame index signal in terms of a coded burst signal derived from the system clock signal by means of memory mapping. Similarly, the reference burst signal consists of a burst of pulses at the color reference subcarrier frequency also derived from the system clock by memory mapping.

Figure 6:
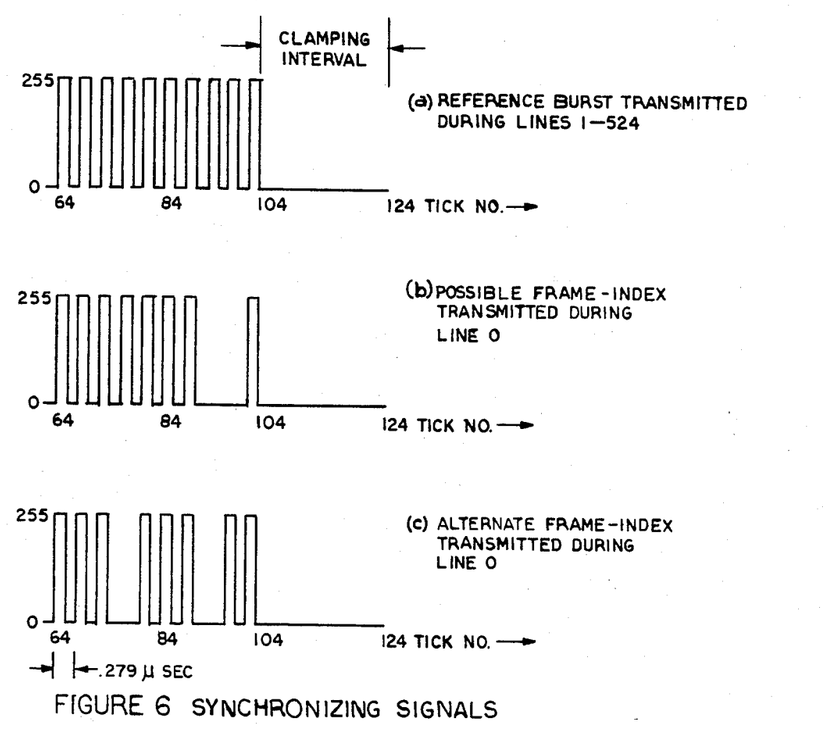
FIG. 6 presents signal waveforms of the reference burst signal and two typical signals which might be used as frame index designators.

The frame index signal is identical in form to the reference burst signal except for the absence of a number of pulses. Both the frame index signal and the reference burst signal have a peak-to-peak magnitude of 256 units on a binary scale with the minimum of each signal equal to 0.

In FIG. 5 the graphs are scaled so that 134.4 IRE units correspond to 256 units in a binary scale. This convention emphasizes the rate-tag information that would be used only for the case of 100% chroma saturation, a situation rarely encountered in practice. In most cases, it would be possible to have full scale represented as 100 IRE units corresponding to 256 units on a binary scale. The basic synchronization scheme described here is very similar but not identical to that disclosed in a previous patent application entitled TELEVISION SYNCHRONIZATION METHOD FOR IMPROVED BANDWIDTH UTILIZATION AND ENCRYPTION CAPABILITY filed by Fishman, Grundler and Bowes.

In the present invention, the coded burst can be transmitted to establish a frame index either near the end of a frame, or in the same time slot as that occupied in a line by the reference burst signal. For simplicity, it is preferable to transmit the frame index signal so that it occupies the same time slot as that occupied by the reference burst signal. However, there is no necessity to always follow this procedure.

The frame index signal and the reference burst signal are generated by generator 83 using memory mapping directed by control processor 43. The gated output of generator 83 is applied to the input of signal combiner 55.

The output of signal combiner 55 is applied to transmitter modulator 87 whose output is then applied to a transmitter 89. Transmitter 89 transmits a signal whose modulation represents a time-division multiplexed (TDM) PAM signal containing time-compressed audio information, synchronization signals, and time-compressed Y, I and Q information. Additional information can also be transmitted in the interval normally allocated to vertical blanking except for the brief interval occupied by the audio and synchronization signals. Any time remaining during the active line after transmission of the compressed video data may be used to incorporate additional audio channels, digitally encoded voice or data channels and/or, possibly, an additional time-compressed video channel.

The output of transmitter 89 is transmitted over a transmission link, (not shown in either FIGS. 3 or 4) to a receiver 91 (see FIG. 4). Receiver 91 has the function of providing a demodulated clamped video signal for the re-encoder (or recoder) portion of the system (shown in FIG. 4). The system includes a frame sync generator 93, an inhibit gate 95, a subcarrier generator 97 and a clock generator 99.

An active clamp is used to adjust the signal reference zero level to a precision voltage setting. The active clamp is actuated by a control signal from a control processor 101 which is very similar in its operation to that of the control processor in the encoder. Synchronization can be obtained only after the burst Key signal derived from control processor 101 is overlapped by the received reference burst signal. This function may be derived conveniently using digital or analog techniques. Since little information content at 3.58 MHz is present except during the reference burst and frame index intervals, a resonant tuned filter can be used to extract the required burst key signal. Alternatively, one can use the synchronization scheme described in pending patent application by Fishman, Grundler and Bowes filed on Aug. 19, 1982 and having Ser. No. 409,445. The preferred embodiment utilizes a combination of both techniques.

The operation of the portion of the system shown in FIG. 4 is essentially the inverse of the operation of the portion of the system described in FIG. 3. Consequently, the remainder of the system shown in FIG. 4 will be discussed only briefly. The first information received during the horizontal blanking interval is a burst of four audio samples. Audio information is passed sequentially by the analog input gates 103, 105, 107 and 109 into the analog storage devices 111, 113, 115 and 117 respectively. The stored information is then read out sequentially over four equally spaced intervals through analog output gates 119, 121, 123 and 125 and applied to a low pass filter 127. The output of the low pass filter is applied to an FM modulator (not shown) to produce the sound subcarrier.

Following the reception of the audio signal, receiver 91 extracts the synchronizing information contained in the frame index signal and the synchronizing burst signal. During the interval occupied by the sychronizing signals, the output of the Y, I and Q channels are all zero. Control signals from the control processor are applied to the comp sync generator 129 and burst gate 131 which generate the conventional NTSC sync and color burst output signals.

After the synchronization signal interval, the received signal contains TDM time-compressed analog Y, I and Q information together with imbedded rate-tag data. In addition the signal contains gaps during which switching takes place bewteen data segments. The Y, I and Q data each have a content-dependent length; and the order of the Y, I and Q data can be permuted as will be discussed later.

Assume for the moment that the Y information precedes the I information, and the I information precedes the Q information. The instructions which identify the rapidly changing and slowly changing data are stored in the data strings containing the Y, I and Q information. Control processor 101 can then make the decision whether the data cells in input buffer 131 contain signal data or control information. Operating upon each Y, I and Q time-compressed signal representation in turn, control processor 101 and reconstruction computer 133 expand the time-compressed data from the Y, I and Q input buffer 131 and replace the rate-tag data with interpolated data. The expanded Y, I and Q data are transferred to FIFO output buffers 135, 137 and 139 respectively.

Parallel readout of the Y, I and Q output buffers is accomplished under control of the control processor 101. Because of the difference in input sampling rates, the Y output buffer is read out four times as fast as the I and Q output buffers. The expanded data read out of the FIFO buffers are applied under control of the control processor 101 to digital to analog converters 141, 143 and 145. Delay networks 147 and 149 are used to compensate for the delays through the system.

Low pass filters 151, 153 and 155 limit the bandwidth of the Y, I and Q information. The I and Q components of the reconstructed chroma signal are applied to balanced modulators 157 and 159 respectively. The outputs of balanced modulators 157 and 159 are summed in adder 161. A reconstructed chroma signal apprearing at the output of adder 161 is applied to the signal combiner 163. The combined NTSC video signal appearing at the output of the signal combiner 163 is then applied through low pass filter 165 to the video modulator.

Data security can be achieved both by inverting the rate-tag data and by permuting the readout order of the Y, I and Q information on a per line basis in a psuedo-random manner. Consequently, 96 possible combinations and permutations are available. A 12-bit word will therefore suffice to identify the control code and to provide error detection and error correction to assure reliable transmission of the control information. Actually, adequate security and decreased complexity can be achieved by employing a subset of only 12 out of the possible 96 combinations and permutations. Thus, an 8-bit word will suffice to identify the control code with an adequate level of error detection and error correction. The control processors each contain a set of up to 12 pairs of ROM's, a pair of which are selected based on the content of the control code.

Addressable control signals designating authorized users are included in the first nine lines of each vertical retrace of interval. No interferance will be incountered with the transmission of any vertical interval test signal (VITS), vertical interval reference signal (VIRS) or other required signal since these specialized signals are transmitted after line nine in the vertical interval. The addressable control signals consist of a sequence of user addresses and instructions identifying the next permutation to be used. When all authorized units have been addressed and issued permutation control commands, an execution command would be issued to all units to change to the new permutation. At this point, the next permutation will be picked at random and entered as the new "next permutation."

The next permutation is encrypted using the National Bureau of Standards (NBS) data encryption standard (DES). Each addressable receiver location has its own decryption key in firmware, This key is known only to the processor at that separate location and at the master location for the system. Compromise of one individual processor would only necessatate removing that address from the authorized users and generating a new key if that address is to be reused. Periodic changes in the firmware at each authorized location minimizes the threat of an undetected compromise.

TIMING CONSIDERATIONS

As described above, the input sampling rate is 4 times the color subcarrier rate which corresponds to 910 elements per line. Time along a horizontal line whose duration is equal to H is, therefore, measured in terms of a time interval (H/910) called a "tick". System timing is established using two clocks; namely, a tick-counter and a line-counter. The tick input is obtained from a precision reference timing signal operating at four times the color reference subcarrier frequency. The tick-counter operates over the range from 0 to 909 and is reset to zero on the clock pulse which follows count 909. The line-counter is incremented on each of the reset pulses applied to the tick-counter is incremented on each of the reset pulses applied to the tick-counter. Line count ranges from 0 to 524; and the line counter is reset to 0 by the tick-counter reset pulse following count 524. The line-counter is also preset by the frame index pulse.

An active line must be equal or greater than 0.825 times 910 elements. Therefore an active line is taken to be at least 752 input elements. Loss of information at the output is minimized by representing the Y information by a corresponding 752 elements. Without data compression, the I and Q information each contain 188 elements; and the total video information is represented by 1128 samples, excluding overhead. An additional 8 clock cycles are allocated for switching operations. Without data compression, the active line would contain a total of 1136 elements. A 51% increase in bandwidth requirement results with transmission of component-separated video unless bandwidth reduction is achieved by further signal processing.

In the simplest embodiment of the audio encoding scheme, PAM, pulse amplitude modulation is used to represent the information in a single audio channel. For simplicity, it is convenient to begin by first considering the timing involved in the readout process.

At clock tick 0, the analog output gates in series with the low pass filter 81 are open; and the output signal level from signal combiner 55 is 0 IRE units. One tick later, corresponding to an interval of 0.07 microseconds, analog output gate 73 is closed. Analog output gate 73 remains closed from tick 1 through tick 14; and gate 73 is opened at tick 15. Similarly, gate 75 is closed from tick 16 through tick 29; gate 77 is closed from tick 31 through 44; and gate 79 is closed from tick 46 thorugh 59. Gate 79 is opened at tick 60 corresponding to an interval of 4.19 microseconds from the start of the blanking interval.

Sync generator 129 is actuated three clock intervals later beginning at tick 64 to produce either the frame index signal or a burst reference signal ending at tick 104 which corresponds to 7.26 microseconds from the start of the blanking interval. An interval of 1.4 microseconds is then allocated in which the output of signal combiner 55 is zero. This interval is used at the receiver portion of the system to clamp the received signal to zero. Finally, the Y, I and Q information is transmitted in a content-dependent format from tick 124 through tick 909. Thus, the total transmission time available for video data is equal to 786 ticks.

Next the timing of the encoder during the reading process is considered, beginning first with the audio information.

Audio information is sampled by sequentially closing analog input gates 65 through 71 in sequence so that only a single input gate is closed at any instant. No analog output gate may be closed at the same time that its input sample storage device is receiving charge through an input gate. Analog input gate 71 must be open just before tick 46. Gate 71 is, therefore, closed over the interval from tick 32 through tick 44. Similarly, gate 65 is closed over the interval from 60 through 282; gate 67 is closed over the interval 284 through 506; and gate 69 is closed from tick 508 through 730. Storage elements 57 through 63 are each charged over equal time intervals slightly less than H/4.

Commencing at tick 136 and ending at tick 909, video input information is sampled once every tick.

The timing details of the processes which occur internally in the Y, I, Q component separator 31 need not be discussed herein.

In summary, the information received at receiver 91 consists of the following:
1. Audio samples commencing at tick 0 and continuing until tick 60.
2. Synchronization signals commencing at tick 64 and terminating at tick 104.
3. A zero reference signal commencing at tick 105 and terminating at tick 123.
4. Separated component video data commencing at tick 124 and terminating at tick 909.
5. Addressable control signals from tick 124 through tick 909 during lines 0 through 9.

The time-compressed Y, I and Q signals recovered by the receiver, 91 are operated upon by ADC 130 and the resulting digital data are stored sequentially in the input buffer memory 131. Reconstruction computer 133 then extracts each sample from the input buffer after a small delay and loads the set of three output FIFO buffer memories 135, 137 and 139 in sequence with expanded Y, I and Q information. FIFO output buffers 135, 137 and 139 are read out in parallel during the interval from tick 136 through tick 909 during the line following that in which the time-compressed data was received.

The system configurations described above are illustrative of the basic principles of the present invention. Numerous modifications and adaptations thereof may be made without departing from the spirit and scope of the basic invention. For example, differential pulse code modulation (DPCM) can be used instead of the hybrid system described previously; again, the rate-tag data can be imbedded in the DPCM signal. Similarly, QAM modulation can be used instead of PAM modulation to encode the audio information so that an additional audio channel can be incorporated without requiring additional bandwidth. The designated input-data block size may be changed from the 16-sample length used here for illustrative purposes. A change of input-data block size, effected by a switch selection at the encoder, may be indicated to the receiver by transmitting an encrypted command/status signal.

What is claimed is:

1. A television signal transmission system incorporating means for processing encoding a repetition reduce signal, said system comprising:
   a. a component separator for generating sampled digital values of the color and intensity components of a television signal,
   b. buffer storage means for storing the separated components of the video signal,
   c. data processing means for comparing successive samples of the component video data and for generating variable-length blocks of data to represent either slowly varying signals or rapidly varying signals,
   d. means for encoding and multiplexing audio and synchronization data into the signal stream,
   e. means for encoding signal and control data for transmission to a receiver,
   f. means for processing the received signal to establish synchronization,
   g. means for demultiplexing the received signal to extract the audio information, and
   h. means for demultiplexing the component video information and reconstructing the composite video signal from the repetition-reduced representation, wherein the signal data is divided into blocks containing a fixed number of input samples and whose output block sizes depend on signal content, and wherein a slowly varying input signal is represented by a reduced number of output samples, and a rapidly varying input signal is represented on a one-to-one basis at corresponding sampling points except where control information is introduced, and further wherein a block of n samples representing a slowly varying input signal succeeded by a block representing another slowly varying input signal is represented by the first and middle samples of the former block; or in the case of a block of n samples representing a segment of input data which is succeeded by a block representing rapidly varying data, the former block is represented by the first n-2 input samples while the last two input samples are replaced by rate-tags; the rate-tags are control signals which have a magnitude of 0 units when the output segment contains no more than two clock intervals or a full-magnitude when the output segment length is greater than two clock intervals.

2. A system according to claim 1 and wherein rate-tag control data in the encoded signal is replaced by interpolated data in the reconstructed signal.

3. A system according to claim 1 and wherein the order of transmission of the representation of the component signals can be permuted on the basis of stored commands and whose order can be further modified by encrypted transmitted commands.

4. A system according to claim 1 wherein the size of the input-data block size can be selected in hardware or firmware and designated at the means for encoding by an encrypted command-status signal.

* * * * *